(12) United States Patent
Zhang

(10) Patent No.: US 12,348,720 B2
(45) Date of Patent: Jul. 1, 2025

(54) DATA PROCESSING METHOD AND APPARATUS

(71) Applicant: BEIJING HUIJUN TECHNOLOGY CO., LTD., Beijing (CN)

(72) Inventor: Shujun Zhang, Beijing (CN)

(73) Assignee: BEIJING HUIJUN TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/260,821

(22) PCT Filed: Apr. 8, 2022

(86) PCT No.: PCT/CN2022/085789
§ 371 (c)(1),
(2) Date: Jul. 10, 2023

(87) PCT Pub. No.: WO2022/222767
PCT Pub. Date: Oct. 27, 2022

(65) Prior Publication Data
US 2024/0073420 A1    Feb. 29, 2024

(30) Foreign Application Priority Data

Apr. 21, 2021  (CN) .......................... 202110432240.9

(51) Int. Cl.
*H04N 19/124*    (2014.01)
*H04N 19/154*    (2014.01)

(52) U.S. Cl.
CPC ......... *H04N 19/124* (2014.11); *H04N 19/154* (2014.11)

(58) Field of Classification Search
CPC .. H04N 19/105; H04N 19/139; H04N 19/172; H04N 19/176; H04N 19/46; H04N 19/513; H04N 19/52; H04N 19/70
See application file for complete search history.

(56) References Cited

U.S. PATENT DOCUMENTS 10,244,266 B1 *  3/2019  Wu .................. H04N 19/126
11,496,738 B1 * 11/2022  Waggoner ............ H04N 19/124
(Continued)

FOREIGN PATENT DOCUMENTS

CN    101331773 A    12/2008
CN    105992004 A    10/2016
(Continued)

OTHER PUBLICATIONS

Chinese Notice of Allowance issued in CN 202110432240.9, dated Apr. 26, 2022. (5 pages).
(Continued)

*Primary Examiner* — Shahan Ur Rahaman
(74) *Attorney, Agent, or Firm* — ICE MILLER LLP; Justin D. Swindells

(57) ABSTRACT

A data processing method and apparatus. An implementation solution including: analyzing an encoding file of a video stream to obtain a target image frame set corresponding to the encoding file and target quantization parameters corresponding to the target image frame set, a target quantization parameter being quantization parameter of a target image frame when the target image frame meets a quality evaluation index; one the basis of a comparison result of the target quantization parameters corresponding to the target image frame set, the encoding file and initial quantization parameters of image frames of the video stream, determining new quantization parameters of the target image frames in the target image frame set and new bit numbers of the target image frames corresponding to the new quantization parameters; and updating the initial quantization parameters and the initial bit numbers of the image frames of the video stream.

15 Claims, 5 Drawing Sheets

(56) References Cited

U.S. PATENT DOCUMENTS

| | | | |
|---|---|---|---|
| 2011/0150094 A1 | 6/2011 | Wang | |
| 2014/0119432 A1* | 5/2014 | Wang | H04N 19/177 375/240.2 |
| 2015/0334395 A1* | 11/2015 | Schwartz | H04N 19/186 375/240.03 |
| 2018/0139456 A1 | 5/2018 | Cheok et al. | |
| 2020/0288143 A1 | 9/2020 | Guo et al. | |

FOREIGN PATENT DOCUMENTS

| | | |
|---|---|---|
| CN | 110139168 A | 8/2019 |
| CN | 110324622 A | 10/2019 |
| CN | 111314698 A | 6/2020 |
| CN | 111479112 A | 7/2020 |
| CN | 112204970 A | 1/2021 |
| CN | 113132757 A | 7/2021 |
| JP | 2007-306277 A | 11/2007 |
| JP | 2010-525739 A | 7/2010 |
| JP | 2023-550642 A | 12/2023 |
| WO | 2008109471 A1 | 9/2008 |
| WO | 2008/133677 A1 | 11/2008 |
| WO | 2020044135 A1 | 3/2020 |
| WO | 2022/115102 A1 | 6/2022 |

OTHER PUBLICATIONS

International Search Report issued in PCT/CN2022/085789, mailed on Jun. 22, 2022. (p. 4).

* cited by examiner

```
                                                                          100
┌─────────────────────────────────────────────────────────────────────┐
│   Analyze an encoding file of a video stream to obtain a target      │
│   image frame set corresponding to the encoding file and target      │──── 101
│   quantization parameters corresponding to the target image frame set│
└─────────────────────────────────────────────────────────────────────┘
                                      │
┌─────────────────────────────────────────────────────────────────────┐
│  Determine a new quantization parameter of each target image frame   │
│  in the target image frame set and new number of bits of each target │
│  image frame corresponding to the new quantization parameter, based  │──── 102
│  on comparison results of the target quantization parameters         │
│  corresponding to the target image frame set, the encoding file, and │
│  initial quantization parameters of the image frames of the video    │
│  stream                                                              │
└─────────────────────────────────────────────────────────────────────┘
                                      │
┌─────────────────────────────────────────────────────────────────────┐
│ Update the initial quantization parameters and initial numbers of    │
│ bits of the image frames of the video stream according to the new    │──── 103
│ quantization parameters and new numbers of bits of the target image  │
│ frames in the target image frame set                                 │
└─────────────────────────────────────────────────────────────────────┘
```

Fig. 1

| $QP_{1pass}$ | $QP_{psnr42}$ | $QP_{new}$ | $QP_{adj}$ |
|---|---|---|---|
| 20 | 18 | 22 | 20 |
| 20 | 22 | 18 | 22 |
| 18 | 22 | 20 | 22 |
| 18 | 20 | 22 | 22 |
| 22 | 18 | 20 | 22 |
| 22 | 20 | 18 | 22 |

Fig. 2

DATA PROCESSING METHOD AND APPARATUS

CROSS-REFERENCE TO RELATED APPLICATIONS

This patent application is a national stage of International Application No. PCT/CN2022/085789, filed on Apr. 8, 2022, which claims priority to Chinese Patent Application No. 202110432240.9 filed on Apr. 21, 2021. Both of the aforementioned applications are hereby incorporated by reference in their entireties.

TECHNICAL FIELD

Embodiments of the present disclosure relate to the field of computer technology, particularly to a data processing method and apparatus.

BACKGROUND

With the development of streaming media technology, there are huge differences between devices on which users watch videos and transmission bandwidths owned by the users. In order to further reduce a bit rate without reducing subjective quality, content provided by users is divided into different quality levels, which may be understood as encoding steps, and an encoding efficiency optimization (Per-Title) method for customizing an encoding step for each piece of content is provided. Existing per-title schemes further include a machine learning-based Per-Title implementation scheme and a context aware encoding (CAE) implementation scheme.

SUMMARY

Embodiments of the preesnt disclosure provide a data processing method apparatrus, an electronic deivce, and a storage medium.

According to a first aspect, some embodiments of the present disclosure provide a data processing mehtod. The method includes: analyzing an encoding file of a video stream to obtain a target image frame set corresponding to the encoding file and target quantization parameters corresponding to the target image frame set, wherein target image frames in the target image frame set are obtained by screening image frames of the video stream based on a quality evaluation index and the encoding file, a target quantization parameter is a quantization parameter of a target image frame when the target image frame satisfies the quality evaluation index, and the encoding file is generated by a primary encoding on the video stream; determining a new quantization parameter of each target image frame in the target image frame set and new number of bits of each target image frame corresponding to the new quantization parameter, based on comparison results of the target quantization parameters corresponding to the target image frame set, the encoding file, and initial quantization parameters of the image frames of the video stream; and updating the initial quantization parameters and initial numbers of bits of the image frames of the video stream according to the new quantization parameters and new numbers of bits of the target image frames in the target image frame set, wherein the updating is completed based on corresponding relationships between the target image frames in the target image frame set and the image frames of the video stream, and the initial quantization parameters and initial numbers of bits of the image frames of the video stream are pre-allocated based on the encoding file during a secondary encoding.

According to a second aspect, some embodiemnts of the present disclosure provide a data processing apparatus. The apparatus includes: an analysis unit, configured to analyze an encoding file of a video stream to obtain a target image frame set corresponding to the encoding file and target quantization parameters corresponding to the target image frame set, wherein target image frames in the target image frame set are obtained by screening image frames of the video stream based on a quality evaluation index and the encoding file, a target quantization parameter is a quantization parameter of a target image frame when the target image frame satisfies the quality evaluation index, and the encoding file is generated by a primary encoding on the video stream; a determination unit, configured to determine a new quantization parameter of each target image frame in the target image frame set and new number of bits of each target image frame corresponding to the new quantization parameter, based on comparison results of the target quantization parameters corresponding to the target image frame set, the encoding file, and initial quantization parameters of the image frames of the video stream; and an update unit, configured to update the initial quantization parameters and initial numbers of bits of the image frames of the video stream according to the new quantization parameters and new numbers of bits of the target image frames in the target image frame set, wherein the updating is completed based on corresponding relationships between the target image frames in the target image frame set and the image frames of the video stream, and the initial quantization parameters and initial numbers of bits of the image frames of the video stream are pre-allocated based on the encoding file during a secondary encoding.

According to a third aspect, some embodimetns of the present disclosure provide an electronic device. The electronic deivce includes: at least one processor; and a memory connected to the at least one processor by communication, where the memory stores instructions executable by the at least one processor, and the instructions are executed by the at least one processor to enable the at least one processor to perform the method according to any one of the implementation described in the first aspect.

According to a fourth aspect, some embodimetns of the present disclosure provide a non-transitory computer-readable storage medium storing computer instructions which are used to cause a computer to perform the method according to any one of the implementation described in the first aspect.

It should be understood that the description in this section is not intended to identify key or critical features of the embodiments of the present disclosure, nor is it intended to limit the scope of the present disclosure. Other features of the present disclosure will become readily apparent from the following description.

BRIEF DESCRIPTION OF THE DRAWINGS

The accompanying drawings are used for better understanding of this solution, and do not constitute limitations to the present disclosure.

FIG. 1 is a schematic diagram of a data processing method according to a first embodiment of the present disclosure;

FIG. 2 is an example diagram of logics for determining new quantization parameters in the data processing method according to a second embodiment of the present disclosure;

DETAILED DESCRIPTION OF EMBODIMENTS

Figure 3:
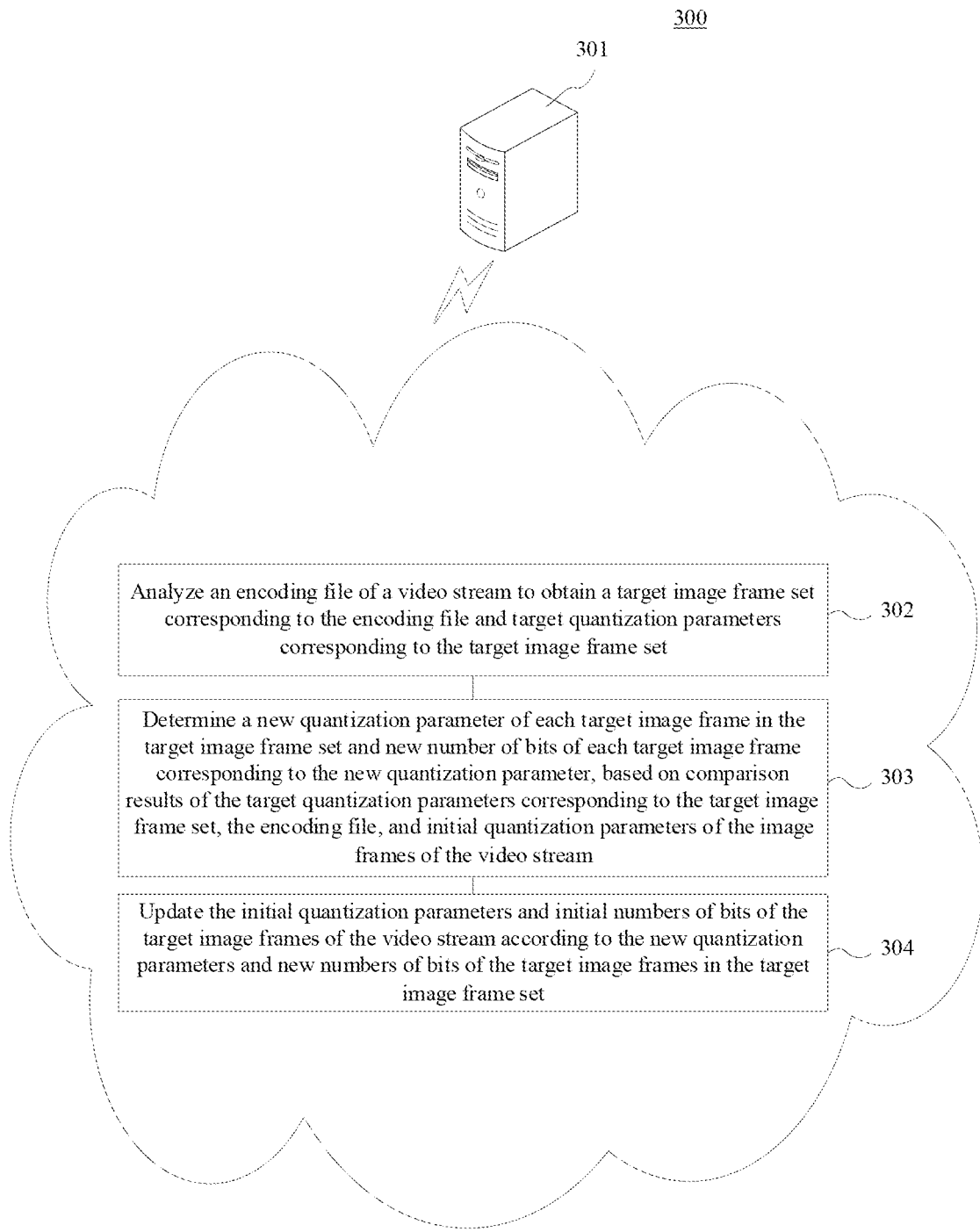
FIG. 3 is a diagram of a scenario that may implement the data processing method according to embodiments of the present disclosure.

Example embodiments of the present disclosure are described below with reference to the accompanying drawings, which include various details of the embodiments of the present disclosure to facilitate understanding, and should be considered as exemplary only. Accordingly, those of ordinary skill in the art should recognize that various changes and modifications may be made to the embodiments described herein without departing from the scope and spirit of the present disclosure. Likewise, for clarity and conciseness, the descriptions of well-known functions and structures are omitted below.

It should be noted that embodiments in the present disclosure and the features of the embodiments may be combined with each other on a non-conflict basis. Embodiments of the present disclosure will be described in detail below with reference to the accompanying drawings.

FIG. 1 shows a schematic diagram 100 of a data processing method according to a first embodiment of the present disclosure. The data processing method includes the following steps.

Step 101: Analyze an encoding file of a video stream to obtain a target image frame set corresponding to the encoding file and target quantization parameters corresponding to the target image frame set.

In this embodiment, an executive subject may obtain the encoding file of the video stream locally or remotely through a wired or wireless connection, and then analyze the obtained encoding file of the video stream to obtain the target image frame set corresponding to the encoding file and target quantization parameters corresponding to the target image frame set. The target image frames in the target image frame set may be obtained by screening the image frames of the video stream based on a quality evaluation index and the encoding file, and the target quantization parameter may be a quantization parameter of a target image frame when the target image frame satisfies the quality evaluation index. The video stream refers to a transmission manner in a process of streaming media transmission, which may represent one or more kinds of: video stream, image stream, and/or animation stream. The video stream may be a video chunk obtained by segmenting or may be a long video, and a length of the video stream is not limited herein. The encoding file may be generated by performing a primary encoding on the video stream according to a first encoding mode. The first encoding mode refers to an encoding mode in video encoding, such as a 1pass mode. The first encoding mode may represent encoding the image frames of the video stream based on a bit rate control mode, and the bit rate control mode is used to represent selecting a bit rate for the image frames based on an encoding step. The bit rate of an image frame refers to data traffic used by the file of the image frame per unit time, such as 800 kbps, 1200 kbps, or 1800 kbps. Various algorithms, such as a commonly used IPB algorithm, may be used for video compression in the first encoding mode. After the algorithmic compression, the encoding file records frame types of corresponding image frames (namely, individual content), such as I frames, P frames, and B frames. The quality evaluation index may be preset according to a quantization error, namely, a peak signal-to-noise ratio, or preset based on various existing or newly added encoding quality evaluation indexes. For example, the quality evaluation index is set as a peak signal-to-noise ratio of a piece of content is not more than 45 db. That is, if a content produces an encoding result more than 45 db on an encoding step, it is considered that the encoding step has an excess bit rate for the content. It should be pointed out that the foregoing wireless connection may include, but is not limited to, 3G, 4G, and 5G connections, a WiFi connection, a Bluetooth connection, a WiMAX connection, a Zigbee connection, a UWB (ultra wideband) connection, and other known or future developed wireless connections. The bit rate control mode may be VBR, CBR, ABR, or the like, which is not limited here.

In this embodiment, the encoding file may include the following data of each image frame: a frame number, a frame type, frame duration, quantization parameter, a number of bits reflecting spatial complexity of the frame, a number of bits reflecting temporal complexity of the frame, other numbers of bits, a quantization error (namely, peak signal-to-noise ratio), reference information, and the like. The number of bits reflecting the spatial complexity of the frame, the number of bits reflecting the temporal complexity of the frame, and the other numbers of bits are accumulated to obtain a traffic size after the frame is encoded.

In some optional implementations of this embodiment, the analyzing an encoding file of a video stream to obtain a target image frame set corresponding to the encoding file and target quantization parameters corresponding to the target image frame set includes: with the encoding file and the quality evaluation index as inputs of a prediction model, outputting by the prediction model the target image frame set and the target quantization parameters corresponding to the target image frame set, the target image frame set being corresponding to the encoding file and the quality evaluation index, where the prediction model is used to characterize screening the image frames in the encoding file and the first quantization parameters of the image frames in the encoding file, based on results of comparing first quantization parameters of the image frames and/or first quantization errors of the image frames in the encoding file with the quality evaluation index, where the first quantization parameter of an image frame and the first quantization error of the image frame are generated by encoding the image frame of the video stream based on a bit rate control mode. The first quantization error is a first peak signal-to-noise ratio, and the first quantization error is used to represent an encoding quality of the current image frame under the first quantization parameter of the current frame. The target quantization parameters are obtained by using a deep learning method, which improves accuracy and efficiency of system processing.

In some optional implementations of this embodiment, the prediction model includes a screening sub-model and a determination sub-model; the prediction model is obtained by pre-training with machine learning technology; and the with the encoding file and the quality evaluation index as inputs of a prediction model, outputting by the prediction model the target image frame set and the target quantization parameters corresponding to the target image frame set includes: inputting the encoding file and the quality evaluation index into the pre-trained screening sub-model to generate the target image frame set corresponding to the encoding file and the quality evaluation index, where the screening sub-model is used to represent screening the image frames in the encoding file based on the results of comparing the first quantization parameters of the image frames and/or the first quantization errors of the image frames in the encoding file with the quality evaluation index; and inputting the generated target image frame set and the quality evaluation index into the pre-trained determination sub-model to generate the target quantization parameters corresponding to the target image frame set corresponding to the quality evaluation index, where the determination sub-model is used to represent estimating a quantization parameter of a target image frame in the target image frame set based on the quality evaluation index. The target quantification parameters are obtained through grading, which improves the efficiency of system processing.

Step 102: Determine a new quantization parameter of each target image frame in the target image frame set and new number of bits of each target image frame corresponding to the new quantization parameter, based on comparison results of the target quantization parameters corresponding to the target image frame set, the encoding file, and initial quantization parameters of the image frames of the video stream.

In this embodiment, the executive subject may compare the target quantization parameters corresponding to the target image frame set obtained in step 101, the quantization parameters of the image frames corresponding to the target image frame set in the encoding file, and the initial quantization parameters of the image frames in the video stream, and determine, based on the comparison results, the new quantization parameter of each target image frame in the target image frame set and the new number of bits of each target image frame corresponding to the new quantization parameter by using a parameter determination method. The number of bits here may refer to number of bits in spatial complexity of the current frame, or may also refer to an accumulated traffic size obtained after the current frame is encoded.

For further example, the parameter determination method is set as follows: if the quantization error psnr of a current frame is greater than 42 db and the quantization parameter $QP_{1pass}$ of the current frame after the primary encoding is greater than a quantization parameter $QP_{psnr42}$ of the current frame at a quantization error of 42 db, the initial quantization parameter $QP_{new}$ pre-allocated to the current frame is determined as $QP_{1pass}$; or if the psnr of the current frame is greater than 42 db and the initial quantization parameter $QP_{new}$ of the current frame is less than the $QP_{psnr42}$, the initial quantization parameter $QP_{new}$ of the current frame is determined as $QP_{psnr42}$ to obtain anew quantization parameter $QP_{adj}$, as shown in FIG. 2.

In some optional implementations of this embodiment, the determining a new quantization parameter of each target image frame in the target image frame set and new number of bits of each target image frame corresponding to the new quantization parameter based on comparison results of the target quantization parameters corresponding to the target image frame set, the encoding file, and initial quantization parameters of the image frames of the video stream includes: determining a new quantization parameter of a target image frame in the target image frame set based on the comparison results of the target quantization parameters corresponding to the target image frame set and the encoding file and the comparison results of the target quantization parameters corresponding to the target image frame set and the initial quantization parameters of the image frames of the video stream; and determining, based on the new quantization parameter, the new number of bits of each target image frame in the target image frame set corresponding to the new quantization parameter by using an estimation model. The estimation model is used to represent calculating the number of bits of a target image frame in the target image frame set under the new quantization parameter according to the first quantization parameter and first number of bits of the corresponding target image frame in the encoding file. A method for accurately and quickly determining quantization parameters and numbers of bits is realized.

Step 103: Update the initial quantization parameters and initial numbers of bits of the image frames of the video stream according to the new quantization parameters and new numbers of bits of the target image frames in the target image frame set.

In this embodiment, the executive subject may update the initial quantization parameters and initial numbers of bits of the image frames of the video stream according to the new quantization parameters and new numbers of bits, determined in step 102, of the target image frames in the target image frame set. The update is completed based on corresponding relationships between the target image frames in the target image frame set and the image frames of the video stream. The initial quantization parameters and initial numbers of bits of the image frames of the video stream are pre-allocated based on the encoding file during secondary encoding. The secondary encoding may represent encoding the video stream again by using a second encoding mode. The secondary encoding mode may be the same as the first encoding mode or different from the first encoding mode, such as a 2pass mode.

In some optional implementations of this embodiment, before analyzing the encoding file of the video stream to obtain the target image frame set corresponding to the encoding file and the target quantization parameters corresponding to the target image frame set, the method further includes: screening data in the encoding file of the video stream to obtain a screened encoding file of the video stream, where the screening is used to represent selecting data of the image frames in the encoding file according to a frame type in the encoding file, and the frame type is used to indicate a compression algorithm for the image frames of the video stream. I and B frames are screened out from the encoded data, and only P image frames are processed, so that data processing is more targeted and the accuracy of system processing is improved.

In some optional implementations of this embodiment, the method further includes: determining a target bit rate of the video stream based on the updated initial numbers of bits of the image frames of the video stream; and/or performing, based on the target bit rate, secondary encoding on the video stream by using a second encoding mode. A problem that a transcoding template provided to users in on-demand application scenarios is only a fixed encoding step, rather than an optimal one, is solved. Compared to existing encoding steps, a method that maintains subjective quality and can moderately reduce a bit rate is implemented without adding encoding times and computations in existing on-demand application scenarios.

It should be noted that the foregoing executive subject may store a pre-trained prediction model. The prediction model may be, for example, a data table or a calculation formula. This embodiment does not impose any limitations on this aspect. A technician may set a model structure of the prediction model according to an actual requirement. This is not limited in embodiments of the present disclosure.

With continued reference to FIG. 3, a data processing method 300 in this embodiment runs on a server 301. First, the server 301 analyzes an encoding file of a video stream to obtain a target image frame set corresponding to the encoding file and target quantization parameters corresponding to the target image frame set 302. Then, the server 301 determines a new quantization parameter of each target image frame in the target image frame set and new number of bits of each target image frame corresponding to the new quantization parameter based on comparison results of the target quantization parameter corresponding to the target image frame set, the encoding file, and initial quantization parameters of the image frames of the video stream 303. Finally, the server 301 updates the initial quantization parameter and initial number of bits of each target image frame of the video stream according to the new quantization parameter and new number of bits of each target image frame in the target image frame set 304.

According to the data processing method provided in the foregoing embodiments of the present disclosure, an encoding file of a video stream is analyzed to obtain a target image frame set corresponding to the encoding file and target quantization parameters corresponding to the target image frame set, where each target image frame in the target image frame set is obtained by screening the image frames of the video stream based on a quality evaluation index and the encoding file, the target quantization parameter is a quantization parameter of a target image frame when the target image frame satisfies the quality evaluation index, and the encoding file is generated by primary encoding on the video stream; a new quantization parameter and new number of bits of each target image frame in the target image frame set are determined based on comparison results of the target quantization parameters corresponding to the target image frame set, the encoding file, and the initial quantization parameters of the image frames of the video stream; and the initial quantization parameter and initial number of bits of each image frame of the video stream are updated according to the new quantization parameter and new number of bits of each target image frame in the target image frame set, where the initial quantization parameter and initial number of bits of each image frame of the video stream are pre-allocated based on the encoding file during secondary encoding, thereby solving problems that, due to repeated encoding of the same content in existing encoding optimization solutions, an amount of computation is large, the existing encoding optimization solution major targets at video slices in a length range of seconds and is difficult to popularize to long videos, and information provided by third parties, such as user equipment information and network attributes, are difficult to obtain in the existing technologies. A data processing method that optimizes encoding efficiency is realized: first pass encoding results are analyzed to obtain quantization parameters of target image frames that exceed a quality evaluation index, which are used for adjusting the quantization parameters and number of bits of frames with excessively high quantization errors (namely, reaching the quality evaluation index) during secondary encoding, so as to save a target bit rate. Compared to existing encoding steps, a method that maintains subjective quality and can moderately reduce a bit rate is implemented without adding encoding times and computations in existing on-demand application scenarios.

Figure 4:
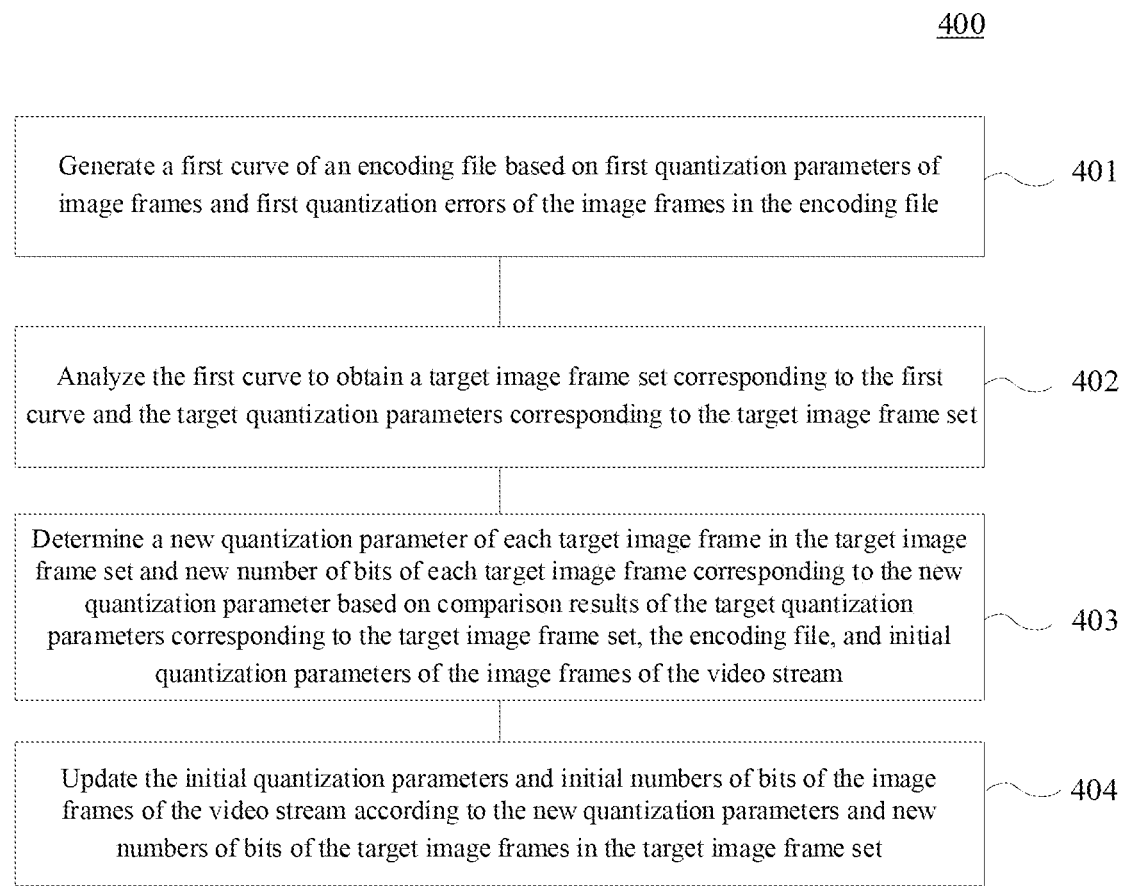
FIG. 4 is a schematic diagram a data processing method according to of a second embodiment of the present disclosure.

Further refer to FIG. 4, which illustrates a schematic diagram 400 of a data processing method according to a second embodiment of the present disclosure. The flow of the method includes the following steps.

Step 401: Generate a first curve of an encoding file based on first quantization parameters of the image frames and first quantization errors of the image frames in the encoding file.

In this embodiment, an executive subject may use a least squares method to fit a quantization parameter-quantization error line based on the first quantization parameters of the image frames and the first quantization errors of the image frames in the encoding file, so as to generate the first curve of the encoding file. The first quantization parameter of an image frame and the first quantization error of the image frame are generated by encoding the image frame of a video stream based on a bit rate control mode. The first curve is a linear fitting curve, and the first curve is used to represent a linear relationship between the first quantization parameter of an image frame and the first quantization error of the corresponding image frame. The first curve employs the first quantization parameter as an X-axis and the first quantization error as a Y-axis.

Step 402: Analyze the first curve to obtain a target image frame set corresponding to the first curve and the target quantization parameters corresponding to the target image frame set.

In this embodiment, the executive subject may analyze the first curve obtained in step 401 to obtain the target image frame set corresponding to the first curve and the target quantization parameters corresponding to the target image frame set. The target image frames of the target image frame set is obtained by screening the image frames of the video stream based on a quality evaluation index and the first curve. For example, data dispersion is larger in positions where the quantization errors are larger (>42 db) and smaller (<31 db), so only image frames with quantization errors between 31 db and 42 db are processed.

Step 403: Determine a new quantization parameter of each target image frame in the target image frame set and new number of bits of each target image frame corresponding to the new quantization parameter based on comparison results of the target quantization parameters corresponding to the target image frame set, the encoding file, and initial quantization parameters of the image frames of the video stream.

Step 404: Update the initial quantization parameters and initial numbers of bits of the image frames of the video stream according to the new quantization parameters and new numbers of bits of the target image frames in the target image frame set.

In this embodiment, detailed operations of steps 403 and 404 are substantially the same as those of steps 102 and 103 in the embodiment shown in FIG. 1, so details are not repeated here.

From FIG. 4, it may be seen that compared to the corresponding embodiment in FIG. 1, the schematic diagram 400 of the data processing method in this embodiment involves generating a first curve of an encoding file based on first quantization parameters and first quantization errors of the image frames in the encoding file, analyzing the first curve to obtain a target image frame set corresponding to the first curve and target quantization parameters corresponding to the target image frame set, and exploring the relationship between the quantization parameter and the quantization error of each image frame (namely, different content of a video stream), thereby implementing a method that maintains subjective quality and can moderately reduce a bit rate without adding number of encoding and computations in existing on-demand application scenarios.

Figure 5:
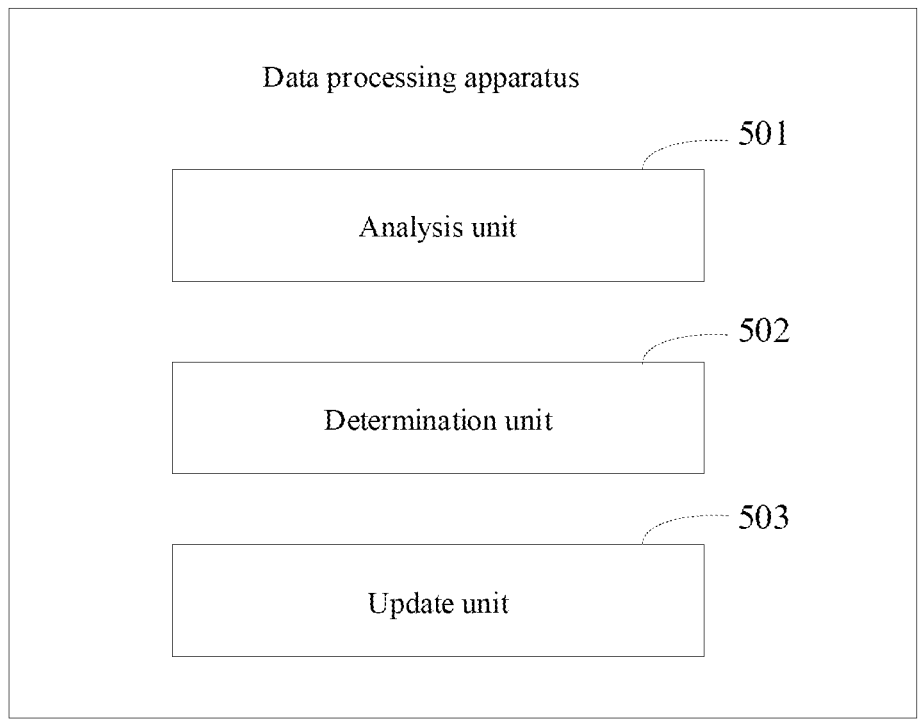
FIG. 5 is a schematic diagram of a structure of a data processing apparatus according to an embodiment of the present disclosure.

Further refer to FIG. 5. As an implementation of the method shown in FIGS. 1-4 above, an embodiment of the present disclosure provides a data processing apparatus. The embodiment of the apparatus corresponds to the embodiment of the method shown in FIG. 1, and the apparatus may be specifically applied to various electronic devices.

As shown in FIG. 5, the data processing apparatus 500 in this embodiment includes: an analysis unit 501, a determination unit 502, and an update unit 503, where the analysis unit is configured to analyze an encoding file of a video stream to obtain a target image frame set corresponding to the encoding file and target quantization parameters corresponding to the target image frame set, where target image frames in the target image frame set are obtained by screening image frames of the video stream based on a quality evaluation index and the encoding file, a target quantization parameter is a quantization parameter of a target image frame when the target image frame satisfies the quality evaluation index, and the encoding file is generated by a primary encoding on the video stream; the determination unit is configured to determine a new quantization parameter of each target image frame in the target image frame set and new number of bits of each target image frame corresponding to the new quantization parameter, based on comparison results of the target quantization parameters corresponding to the target image frame set, the encoding file, and initial quantization parameters of the image frames of the video stream; and the update unit is configured to update the initial quantization parameters and initial numbers of bits of the image frames of the video stream according to the new quantization parameters and new numbers of bits of the target image frames in the target image frame set, where the updating is completed based on corresponding relationships between the target image frames in the target image frame set and the image frames of the video stream, and the initial quantization parameters and initial numbers of bits of the image frames of the video stream are pre-allocated based on the encoding file during a secondary encoding.

In this embodiment, the detailed processing of the analysis unit 501, the determination unit 502, and the update unit 503 of the data processing apparatus 500 and the technical effects brought thereby may be referred to the related descriptions of steps 101 to 103 in the embodiment corresponding to FIG. 1, so details are not repeated here.

In some optional implementations of this embodiment, the analysis unit includes: a generation module, configured to generate a first curve of the encoding file based on first quantization parameters of image frames and first quantization errors of image frames in the encoding file, where the first curve is used to represent a linear relationship between the first quantization parameters of the image frames and the first quantization errors of the corresponding image frames; and an analysis module, configured to analyze the first curve to obtain the target image frame set corresponding to the first curve and the target quantization parameters corresponding to the target image frame set, where the target image frames of the target image frame set are obtained by screening the image frames of the video stream based on the quality evaluation index and the first curve.

In some optional implementations of this embodiment, the analysis unit is further configured to, with the encoding file and the quality evaluation index as inputs of a prediction model, output by the prediction model the target image frame set and the target quantization parameters corresponding to the target image frame set, the target image frame set being corresponding to the encoding file and the quality evaluation index, where the prediction model is used to characterize screening the image frames in the encoding file and the first quantization parameters of the image frames in the encoding file based on comparison results of the first quantization parameters of the image frames and/or the first quantization errors of the image frames in the encoding file and the quality evaluation index, where the first quantization parameters of the image frames and the first quantization errors of the image frames are generated by encoding the image frames of the video stream based on a bit rate control mode.

In some optional implementations of this embodiment, the prediction model in the analysis unit includes: a screening sub-model and a determination sub-model; the prediction model in the analysis unit is obtained by pre-training with machine learning technology; and the analysis unit includes: a screening module, configured to input the encoding file and the quality evaluation index into the pre-trained screening sub-model to generate the target image frame set corresponding to the encoding file and the quality evaluation index, where the screening sub-model is used to characterize screening the image frames in the encoding file based on the comparison results of the first quantization parameters of the image frames and/or the first quantization errors of the image frames in the encoding file and the quality evaluation index; and a determination module, configured to input the generated target image frame set and the quality evaluation index into the pre-trained determination sub-model to generate the target quantization parameters corresponding to the target image frame set, where the determination sub-model is used to characterize estimating a quantization parameter of a target image frame in the target image frame set based on the quality evaluation index.

In some optional implementations of this embodiment, the determination unit includes: a first determination module, configured to determine a new quantization parameter of a target image frame in the target image frame set based on the comparison results of the target quantization parameters corresponding to the target image frame set and the encoding file and comparison results of the target quantization parameters corresponding to the target image frame set and the initial quantization parameters of the image frames of the video stream; and a second determination module, configured to determine, based on the new quantization parameter, the new number of bits of the target image frame in the target image frame set corresponding to the new quantization parameter by using an estimation model, where the estimation model is used to characterize calculating a number of bits of the target image frame in the target image frame set under the new quantization parameter according to the first quantization parameter and first number of bits of the corresponding target image frame in the encoding file.

In some optional implementations of this embodiment, the apparatus further includes: a selection unit, configured to screen data in the encoding file of the video stream to obtain a screened encoding file of the video stream, where the screening is used to represent selecting data of the image frames in the encoding file according to a frame type in the encoding file, and the frame type is used to indicate a compression algorithm for the image frames of the video stream.

In some optional implementations of this embodiment, the apparatus further includes: a generation unit, configured to generate a target bit rate of the video stream based on the updated initial numbers of bits of the image frames of the video stream; and an encoding unit, configured to perform, based on the target bit rate, secondary encoding on the video stream by using a second encoding mode.

According to the embodiments of the present disclosure, an electronic device and a readable storage medium are provided.

Figure 6:
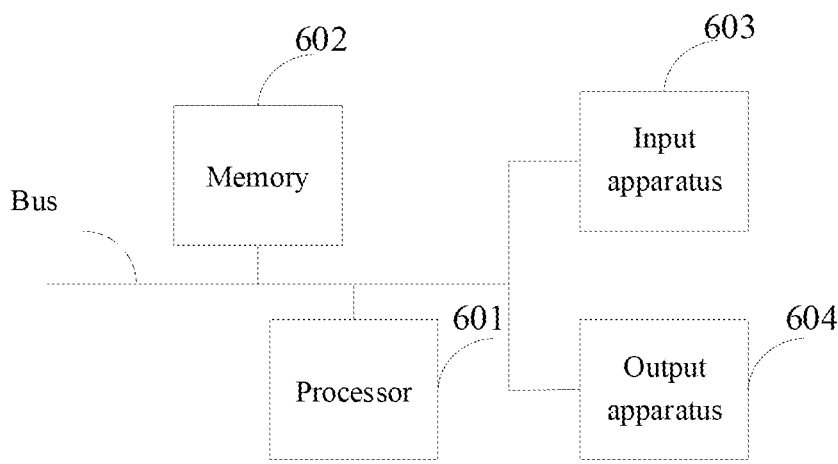
FIG. 6 is a block diagram of an electronic device used to implement the data processing method according to embodiments of the present disclosure.

FIG. 6 shows a block diagram of an electronic device for the data processing method according to embodiments of the present disclosure. The electronic device is intended to represent various forms of digital computers, such as a laptop, a desktop, a worktable, a personal digital assistant, a server, a blade server, a mainframe computer, and other suitable computers. The electronic device may further represent various forms of mobile apparatuses, such as a personal digital assistant, a cellular phone, a smart phone, a wearable device, and other similar computing apparatuses. For components shown herein, their connections and relationships, and their functions are by way of example only, and are not intended to limit implementations of the present disclosure described and/or claimed herein.

As shown in FIG. 6, the electronic device includes: one or more processors 601, a memory 602, and interfaces for connecting various components, including high-speed interfaces and low-speed interfaces. All the components are interconnected by different buses and may be mounted on a common motherboard or mounted in other ways as required. The processor may process instructions executed within the electronic device, including instructions stored in or on a memory to display graphical information of GUI on an external input/output apparatus (such as a display device coupled to the interface). In other embodiments, a plurality of processors and/or a plurality of buses may be used with a plurality of memories and a plurality of memories, if necessary. Likewise, a plurality of electronic devices may be connected, each providing some necessary operations (for example, as a server array, a group of blade servers, or a multiprocessor system). In FIG. 6, one processor 601 is used as an example.

The memory 602 is a non-transitory computer-readable storage medium provided by an embodiment of the present disclosure. The memory stores instructions executable by at least one processor, so that the at least one processor performs the data processing method provided by embodiments of the present disclosure. The non-transitory computer-readable storage medium stores computer instructions, and the computer instructions are used to cause a computer to perform the data processing method provided by embodiments of the present disclosure.

As a non-transitory computer-readable storage medium, the memory 602 may be used to store non-transitory software programs, non-transitory computer-executable programs and modules, such as program instructions/modules corresponding to the data processing method in embodiments of the present disclosure (for example, the analysis unit 501, the determination unit 502, and the update unit 503 shown in FIG. 5). The processor 601 runs the non-transitory software programs, instructions and modules stored in the memory 602 to execute various functional applications and data processing of the server, that is, to implement the data processing method in the foregoing method embodiments.

The memory 602 may include a program storage region and a data storage region, where the program storage region may store an operating system, and an application program required by at least one function; and the data storage region may store data created according to the use of the data processing electronic device. In addition, the memory 602 may include a high-speed random access memory, and may further include a non-transitory memory, such as at least one magnetic disk storage device, flash memory device, or other non-transitory solid-state storage device. In some embodiments, the memory 602 may optionally include memories disposed remotely from the processor 601, and these remote memories may be connected to the data processing electronic device through a network. Examples of the network include, but are not limited to, the Internet, an intranet, a local area network, a mobile communications network, or a combination thereof.

The electronic device for the data processing method may further include an input apparatus 603 and an output apparatus 604. The processor 601, the memory 602, the input apparatus 603, and the output apparatus 604 may be connected by a bus or other means. In FIG. 6, bus connection is used as an example.

The input apparatus 603 may receive input numeric or character information, and generate key signal input related to user settings and function control of the data processing electronic device, such as a touch screen, a keypad, a mouse, a trackpad, a touchpad, an indicating arm, one or more mouse buttons, a trackball, a joystick, and other input apparatuses. The output apparatus 604 may include a display device, an auxiliary lighting apparatus (such as an LED), a tactile feedback apparatus (such as a vibration motor), and the like. The display device may include, but is not limited to, a liquid crystal display (LCD), an LED display, and a plasma display. In some implementation modes, the display device may be a touch screen.

The implementations of the system and technology described here may be implemented in a digital electronic circuit system, an integrated circuit system, an ASIC (application-specific integrated circuit), computer hardware, firmware, software, and/or a combination thereof. The implementations may include implementations in one or more computer programs executable and/or interpretable on a programmable system including at least one programmable processor. The programmable processor may be a special-purpose or general-purpose programmable processor, and may receive data and instructions from a storage system, at least one input apparatus, and at least one output apparatus, and transmit data and instructions to the storage system, the at least one input apparatus, and the at least one output apparatus.

The computing programs (also known as programs, software, software applications, or code) include machine instructions for programmable processors and may be implemented by using advanced processes and/or object-oriented programming languages, and/or assembly/machine languages. As used herein, the terms "machine-readable medium" and "computer-readable medium" refer to any computer program product, device, and/or apparatus (for example, a magnetic disk, an optical disk, a memory, and a programmable logic device (PLD) for providing machine instructions and/or data to a programmable processor, including a machine-readable medium that receives machine instructions as machine-readable signals. The term "machine-readable signal" refers to any signal used to provide machine instructions and/or data to the programmable processor.

To provide interaction with a user, the system and technology described herein may be implemented on a computer, the computer including: a display device (for example, a CRT (cathode ray tube) or LCD (liquid crystal display) monitor) for displaying information to the user); and a keyboard and a pointing device (for example, a mouse or a trackball) through which the user may provide input to the computer. Other types of apparatuses may also be used to provide interaction with the user, for example, the feedback provided to the user may be any form of sensory feedback (for example, visual feedback, auditory feedback, or tactile feedback); and may be in any form (including acoustic input, voice input, or tactile input) to receive input from the user.

The system and technology described herein may be implemented on a computing system including back-end components (for example, serving as a data server), or a computing system including middleware components (for example, an application server), or a computing system including front-end components (for example, a user computer having a graphical user interface or a web browser through which the user can interact with the embodiments of the system and technology described herein), or a computing system including any combination of such back-end components, middleware components, or front-end components. The components of the system may be interconnected by any form or medium of digital data communication (for example, a communication network). Examples of the communication network include: a local area network (LAN), a wide area network (WAN), and the Internet.

A computer system may include a client and a server. The client and the server are generally far away from each other and usually interact through a communications network. A relationship between the client and the server is generated by computer programs running on respective computers and having a client-server relationship with each other.

According to the technical solutions in embodiments of the present disclosure, an encoding file of a video stream is analyzed to obtain a target image frame set corresponding to the encoding file and target quantization parameters corresponding to the target image frame set, where target image frames in the target image frame set is obtained by screening the image frames of the video stream based on a quality evaluation index and the encoding file, a target quantization parameter is a quantization parameter of a target image frame when the target image frame satisfies the quality evaluation index, and the encoding file is generated by primary encoding on the video stream; a new quantization parameter and new number of bits of each target image frame in the target image frame set are determined based on comparison results of the target quantization parameters corresponding to the target image frame set, the encoding file, and the initial quantization parameters of the image frames of the video stream; and the initial quantization parameter and the initial number of bits of each image frame of the video stream are updated according to the new quantization parameter and new number of bits of the target image frame in the target image frame set, where the initial quantization parameter and initial number of bits of each image frame of the video stream are pre-allocated based on the encoding file during secondary encoding, thereby solving problems that, due to repeated encoding of the same content in existing encoding optimization solutions, an amount of computation is large, the existing encoding optimization solution major targets at video slices in a length range of seconds and is difficult to popularize to long videos, and information provided by third parties, such as user equipment information and network attributes, are difficult to obtain in the existing technologies. A data processing method that optimizes encoding efficiency is realized: first pass encoding results are analyzed to obtain quantization parameters of target image frames that exceed a quality evaluation index, which are used for adjusting the quantization parameters and number of bits of frames with excessively high quantization errors (namely, reaching the quality evaluation index) during second pass encoding, so as to save a target bit rate. Compared to existing encoding steps, a method that maintains subjective quality and can moderately reduce a bit rate is implemented without adding encoding times and computations in existing on-demand application scenarios.

It should be understood that steps may be reordered, added, or deleted based on the various forms of procedures shown above. For example, the steps described in embodiments of the present disclosure may be executed in parallel, sequentially or in different orders. As long as the desired results of the technical solutions disclosed in embodiments of the present disclosure may be achieved, no limitation is imposed herein.

The foregoing specific implementations do not constitute limitations to the protection scope of the present disclosure. It should be understood by those skilled in the art that various modifications, combinations, sub-combinations and substitutions may be conducted according to design requirements and other factors. Any modifications, equivalent replacements, improvements, and the like made within the spirit and principles of the present disclosure shall fall within the protection scope of the present disclosure.

What is claimed is:

1. A data processing method, comprising:

analyzing an encoding file of a video stream to obtain a target image frame set corresponding to the encoding file and target quantization parameters corresponding to the target image frame set, wherein target image frames in the target image frame set are obtained by screening image frames of the video stream based on a quality evaluation index and the encoding file, a target quantization parameter is a quantization parameter of a target image frame when the target image frame satisfies the quality evaluation index, and the encoding file is generated by a primary encoding on the video stream;

determining a new quantization parameter of each target image frame in the target image frame set and new number of bits of each target image frame corresponding to the new quantization parameter, based on comparison results of the target quantization parameters corresponding to the target image frame set, the encoding file, and initial quantization parameters of the image frames of the video stream; and updating the initial quantization parameters and initial numbers of bits of the image frames of the video stream according to new quantization parameters and new numbers of bits of the target image frames in the target image frame set, wherein the updating is completed based on corresponding relationships between the target image frames in the target image frame set and the image frames of the video stream, and the initial quantization parameters and initial numbers of bits of the image frames of the video stream are pre-allocated based on the encoding file during a secondary encoding, wherein the analyzing an encoding file of a video stream to obtain a target image frame set corresponding to the encoding file and target quantization parameters corresponding to the target image frame set comprises:

generating a first curve of the encoding file based on first quantization parameters of image frames and first quantization errors of image frames in the encoding file, wherein the first curve is used to represent a linear relationship between the first quantization parameters of the image frames and the first quantization errors of the corresponding image frames; and analyzing the first curve to obtain the target image frame set corresponding to the first curve and the target quantization parameters corresponding to the target image frame set, wherein the target image frames of the target image frame set are obtained by screening the image frames of the video stream based on the quality evaluation index and the first curve.

2. The method according to claim 1, wherein the analyzing an encoding file of a video stream to obtain a target image frame set corresponding to the encoding file and target quantization parameters corresponding to the target image frame set comprises:
with the encoding file and the quality evaluation index as inputs of a prediction model, outputting by the prediction model the target image frame set and the target quantization parameters corresponding to the target image frame set, the target image frame set being corresponding to the encoding file and the quality evaluation index, wherein the prediction model is used to characterize screening the image frames in the encoding file and the first quantization parameters of the image frames in the encoding file based on comparison results of the first quantization parameters of the image frames and/or the first quantization errors of the image frames in the encoding file and the quality evaluation index, wherein the first quantization parameters of the image frames and the first quantization errors of the image frames are generated by encoding the image frames of the video stream based on a bit rate control mode.

3. The method according to claim 2, wherein the prediction model comprises a screening sub-model and a determination sub-model; the prediction model is obtained by pre-training with machine learning technology; and the with the encoding file and the quality evaluation index as inputs of a prediction model, outputting by the prediction model the target image frame set and the target quantization parameters corresponding to the target image frame set comprises:
inputting the encoding file and the quality evaluation index into the pre-trained screening sub-model to generate the target image frame set corresponding to the encoding file and the quality evaluation index, wherein the screening sub-model is used to characterize screening the image frames in the encoding file based on the comparison results of the first quantization parameters of the image frames and/or the first quantization errors of the image frames in the encoding file and the quality evaluation index; and
inputting the generated target image frame set and the quality evaluation index into the pre-trained determination sub-model to generate the target quantization parameters corresponding to the target image frame set, wherein the determination sub-model is used to characterize estimating a quantization parameter of a target image frame in the target image frame set based on the quality evaluation index.

4. The method according to claim 1, wherein the determining a new quantization parameter of each target image frame in the target image frame set and new number of bits of each target image frame corresponding to the new quantization parameter based on comparison results of the target quantization parameters corresponding to the target image frame set, the encoding file, and initial quantization parameters of the image frames of the video stream comprises:
determining a new quantization parameter of a target image frame in the target image frame set based on the comparison results of the target quantization parameters corresponding to the target image frame set and the encoding file and comparison results of the target quantization parameters corresponding to the target image frame set and the initial quantization parameters of the image frames of the video stream; and
determining, based on the new quantization parameter, the new number of bits of the target image frame in the target image frame set corresponding to the new quantization parameter by using an estimation model, wherein the estimation model is used to characterize calculating a number of bits of the target image frame in the target image frame set under the new quantization parameter according to the first quantization parameter and first number of bits of the corresponding target image frame in the encoding file.

5. The method according to claim 1, wherein before analyzing the encoding file of the video stream to obtain the target image frame set corresponding to the encoding file and the target quantization parameters corresponding to the target image frame set, the method further comprises:
screening data in the encoding file of the video stream to obtain a screened encoding file of the video stream, wherein the screening is used to represent selecting data of the image frames in the encoding file according to a frame type in the encoding file, and the frame type is used to indicate a compression algorithm for the image frames of the video stream.

6. The method according to claim 1, further comprising:
determining a target bit rate of the video stream based on the updated initial numbers of bits of the image frames of the video stream; and/or
performing, based on the target bit rate, secondary encoding on the video stream by using a second encoding mode.

7. An electronic device, comprising:
at least one processor; and
a memory connected to the at least one processor by communication, wherein
the memory stores instructions executable by the at least one processor, and the instructions are executed by the at least one processor to enable the at least one processor to perform operations, the operations comprising:
analyzing an encoding file of a video stream to obtain a target image frame set corresponding to the encoding file and target quantization parameters corresponding to the target image frame set, wherein target image frames in the target image frame set are obtained by screening image frames of the video stream based on a quality evaluation index and the encoding file, a target quantization parameter is a quantization parameter of a target image frame when the target image frame satisfies the quality evaluation index, and the encoding file is generated by a primary encoding on the video stream;
determining a new quantization parameter of each target image frame in the target image frame set and new number of bits of each target image frame corresponding to the new quantization parameter, based on comparison results of the target quantization parameters corresponding to the target image frame set, the encoding file, and initial quantization parameters of the image frames of the video stream; and
updating the initial quantization parameters and initial numbers of bits of the image frames of the video stream according to new quantization parameters and new numbers of bits of the target image frames in the target image frame set, wherein the updating is completed based on corresponding relationships between the target image frames in the target image frame set and the image frames of the video stream, and the initial quantization parameters and initial numbers of bits of the image frames of the video stream are pre-allocated based on the encoding file during a secondary encoding, wherein the analyzing an encoding file of a video stream to obtain a target image frame set corresponding to the encoding file and target quantization parameters corresponding to the target image frame set comprises:

generating a first curve of the encoding file based on first quantization parameters of image frames and first quantization errors of image frames in the encoding file, wherein the first curve is used to represent a linear relationship between the first quantization parameters of the image frames and the first quantization errors of the corresponding image frames; and analyzing the first curve to obtain the target image frame set corresponding to the first curve and the target quantization parameters corresponding to the target image frame set, wherein the target image frames of the target image frame set are obtained by screening the image frames of the video stream based on the quality evaluation index and the first curve.

8. A non-transitory computer-readable storage medium, storing computer instructions thereon, wherein the computer instructions are used to cause a computer to perform operations, the operations comprising:

analyzing an encoding file of a video stream to obtain a target image frame set corresponding to the encoding file and target quantization parameters corresponding to the target image frame set, wherein target image frames in the target image frame set are obtained by screening image frames of the video stream based on a quality evaluation index and the encoding file, a target quantization parameter is a quantization parameter of a target image frame when the target image frame satisfies the quality evaluation index, and the encoding file is generated by a primary encoding on the video stream;

determining a new quantization parameter of each target image frame in the target image frame set and new number of bits of each target image frame corresponding to the new quantization parameter, based on comparison results of the target quantization parameters corresponding to the target image frame set, the encoding file, and initial quantization parameters of the image frames of the video stream; and updating the initial quantization parameters and initial numbers of bits of the image frames of the video stream according to new quantization parameters and new numbers of bits of the target image frames in the target image frame set, wherein the updating is completed based on corresponding relationships between the target image frames in the target image frame set and the image frames of the video stream, and the initial quantization parameters and initial numbers of bits of the image frames of the video stream are pre-allocated based on the encoding file during a secondary encoding, wherein the analyzing an encoding file of a video stream to obtain a target image frame set corresponding to the encoding file and target quantization parameters corresponding to the target image frame set comprises:

generating a first curve of the encoding file based on first quantization parameters of image frames and first quantization errors of image frames in the encoding file, wherein the first curve is used to represent a linear relationship between the first quantization parameters of the image frames and the first quantization errors of the corresponding image frames; and analyzing the first curve to obtain the target image frame set corresponding to the first curve and the target quantization parameters corresponding to the target image frame set, wherein the target image frames of the target image frame set are obtained by screening the image frames of the video stream based on the quality evaluation index and the first curve.

9. The non-transitory computer-readable storage medium according to claim 8, wherein the analyzing an encoding file of a video stream to obtain a target image frame set corresponding to the encoding file and target quantization parameters corresponding to the target image frame set comprises:

with the encoding file and the quality evaluation index as inputs of a prediction model, outputting by the prediction model the target image frame set and the target quantization parameters corresponding to the target image frame set, the target image frame set being corresponding to the encoding file and the quality evaluation index, wherein the prediction model is used to characterize screening the image frames in the encoding file and the first quantization parameters of the image frames in the encoding file based on comparison results of the first quantization parameters of the image frames and/or the first quantization errors of the image frames in the encoding file and the quality evaluation index, wherein the first quantization parameters of the image frames and the first quantization errors of the image frames are generated by encoding the image frames of the video stream based on a bit rate control mode.

10. The non-transitory computer-readable storage medium according to claim 9, wherein the prediction model comprises a screening sub-model and a determination sub-model; the prediction model is obtained by pre-training with machine learning technology; and the with the encoding file and the quality evaluation index as inputs of a prediction model, outputting by the prediction model the target image frame set and the target quantization parameters corresponding to the target image frame set comprises:

inputting the encoding file and the quality evaluation index into the pre-trained screening sub-model to generate the target image frame set corresponding to the encoding file and the quality evaluation index, wherein the screening sub-model is used to characterize screening the image frames in the encoding file based on the comparison results of the first quantization parameters of the image frames and/or the first quantization errors of the image frames in the encoding file and the quality evaluation index; and inputting the generated target image frame set and the quality evaluation index into the pre-trained determination sub-model to generate the target quantization parameters corresponding to the target image frame set, wherein the determination sub-model is used to characterize estimating a quantization parameter of a target image frame in the target image frame set based on the quality evaluation index.

11. The electronic device according to claim 7, wherein the analyzing an encoding file of a video stream to obtain a target image frame set corresponding to the encoding file and target quantization parameters corresponding to the target image frame set comprises:

with the encoding file and the quality evaluation index as inputs of a prediction model, outputting by the prediction model the target image frame set and the target quantization parameters corresponding to the target image frame set, the target image frame set being corresponding to the encoding file and the quality evaluation index, wherein the prediction model is used to characterize screening the image frames in the encoding file and the first quantization parameters of the image frames in the encoding file based on comparison results of the first quantization parameters of the image frames and/or the first quantization errors of the image frames in the encoding file and the quality evaluation index, wherein the first quantization parameters of the image frames and the first quantization errors of the image frames are generated by encoding the image frames of the video stream based on a bit rate control mode.

12. The electronic device according to claim 11, wherein the prediction model comprises a screening sub-model and a determination sub-model; the prediction model is obtained by pre-training with machine learning technology; and the with the encoding file and the quality evaluation index as inputs of a prediction model, outputting by the prediction model the target image frame set and the target quantization parameters corresponding to the target image frame set comprises:

inputting the encoding file and the quality evaluation index into the pre-trained screening sub-model to generate the target image frame set corresponding to the encoding file and the quality evaluation index, wherein the screening sub-model is used to characterize screening the image frames in the encoding file based on the comparison results of the first quantization parameters of the image frames and/or the first quantization errors of the image frames in the encoding file and the quality evaluation index; and inputting the generated target image frame set and the quality evaluation index into the pre-trained determination sub-model to generate the target quantization parameters corresponding to the target image frame set, wherein the determination sub-model is used to characterize estimating a quantization parameter of a target image frame in the target image frame set based on the quality evaluation index.

13. The electronic device according to claim 7, wherein the determining a new quantization parameter of each target image frame in the target image frame set and new number of bits of each target image frame corresponding to the new quantization parameter based on comparison results of the target quantization parameters corresponding to the target image frame set, the encoding file, and initial quantization parameters of the image frames of the video stream comprises:

determining a new quantization parameter of a target image frame in the target image frame set based on the comparison results of the target quantization parameters corresponding to the target image frame set and the encoding file and comparison results of the target quantization parameters corresponding to the target image frame set and the initial quantization parameters of the image frames of the video stream; and determining, based on the new quantization parameter, the new number of bits of the target image frame in the target image frame set corresponding to the new quantization parameter by using an estimation model, wherein the estimation model is used to characterize calculating a number of bits of the target image frame in the target image frame set under the new quantization parameter according to the first quantization parameter and first number of bits of the corresponding target image frame in the encoding file.

14. The electronic device according to claim 7, wherein before analyzing the encoding file of the video stream to obtain the target image frame set corresponding to the encoding file and the target quantization parameters corresponding to the target image frame set, the operations further comprise:

screening data in the encoding file of the video stream to obtain a screened encoding file of the video stream, wherein the screening is used to represent selecting data of the image frames in the encoding file according to a frame type in the encoding file, and the frame type is used to indicate a compression algorithm for the image frames of the video stream.

15. The electronic device according to claim 7, wherein the operations further comprise:

determining a target bit rate of the video stream based on the updated initial numbers of bits of the image frames of the video stream; and/or performing, based on the target bit rate, secondary encoding on the video stream by using a second encoding mode.

\* \* \* \* \*